(12) United States Patent
Blaicher

(10) Patent No.: US 7,111,003 B2
(45) Date of Patent: Sep. 19, 2006

(54) SYSTEM AND METHOD FOR INPUTING DATA TO A SORT UTILITY FROM A USER PROGRAM

(75) Inventor: Christopher Youngs Blaicher, Austin, TX (US)

(73) Assignee: BMC Software, Houston, TX (US)

( * ) Notice: Subject to any disclaimer, the term of this patent is extended or adjusted under 35 U.S.C. 154(b) by 433 days.

(21) Appl. No.: 10/195,649

(22) Filed: Jul. 15, 2002

(65) Prior Publication Data

US 2004/0010494 A1    Jan. 15, 2004

(51) Int. Cl.
G06F 7/22 (2006.01)

(52) U.S. Cl. ............... 707/7; 707/8; 707/100; 719/328

(58) Field of Classification Search .......... 707/1, 707/7, 10; 719/328
See application file for complete search history.

(56) References Cited

U.S. PATENT DOCUMENTS

| | | | |
|---|---|---|---|
| 4,587,628 A * | 5/1986 | Archer et al. ............... 719/328 |
| 5,535,378 A * | 7/1996 | Arnold ............................ 707/1 |
| 5,799,307 A * | 8/1998 | Buitron ....................... 707/100 |
| 5,893,079 A * | 4/1999 | Cwenar ........................ 705/36 |
| 6,295,539 B1 * | 9/2001 | Isip, Jr. ....................... 707/201 |

* cited by examiner

Primary Examiner—Jean M. Corrielus

(57) ABSTRACT

A method and system for inputing data to a sort utility from a user program. In one embodiment, first parameters may facilitate optimization for both programs, by either the user program or the sort utility. The sort utility may process the first parameters to optimize sorting by: returning second parameters to the user program; and supporting a multi-record interface between the two programs. The sort utility may process the data records into the multi-record interface by constructing reformatted data records and inserting the reformatted data records into the multi-record interface, or by utilizing an exit routine to construct and insert the reformatted data records into the multi-record interface. The sort utility may sort the data records (e.g., by directly processing them), optimizing memory usage by the sort utility and/or the user program. The processing and sorting actions of the sort utility program may be coordinated and overlapped.

50 Claims, 3 Drawing Sheets

FIRST COMPUTER SYSTEM

200

FIRST COMPUTER SYSTEM

SYSTEM AND METHOD FOR INPUTING DATA TO A SORT UTILITY FROM A USER PROGRAM

BACKGROUND OF THE INVENTION

1. Field of the Invention

The present invention relates to sorting data records and more particularly to a system and method for inputing data to a sort utility from a user program.

2. Description of the Related Art

The process of sorting data records using a digital computer generally involves the reading of unordered data into memory from external storage media, ordering the records into a specified sequence, and writing the records to external storage media. In many cases, the reading and writing of the data records from and to external media is done by the sort utility itself. There are occasions when another user program or routine may be used to read and/or write the data. The user program or routine may be used for a number of different reasons. Among these reasons are: (1) record selection, (2) record content editing, (3) obtaining records from a source that the sort utility is not capable of reading.

Typically, sorting requires a large amount of computer resources in the form of memory and computer time. Another resource is elapsed time, or the time that transpires from the start of the process to the end of the process.

One current prior art process by which a user program provides input data to a sort utility uses a record level interface between a user written program called an E15 routine and the sort utility. Within the IBM mainframe environment, this interface is known as the E15 interface. Within the E15 interface, the E15 routine is responsible for the reading of the data from an external storage medium, if any, and/or the dynamic creation of the data to be sorted by the sort utility.

The E15 interface algorithm is described in further detail in FIG. 1. As shown in step 101 of FIG. 1, the user program allocates buffers for use in reading data from an external medium. In doing so, the user program logically connects the external media with the user program and/or E15 routine. One common alternative is to delay the allocation of buffers and logical connection of the external medium until the first call by the sort utility to the E15 routine in step 104.

In step 102, the user program invokes the sort utility. In invoking the sort utility, the user program builds a set of parameters, then passes the set of parameters to the sort utility. One of the parameters in the set of parameters is the address of the routine responsible for presenting data to the sort, also known as the E15 routine. The E15 routine may be part of the user program or it may be a separate program unto itself. Additional parameters may include: the parts of the record to be used as sort keys and the desired sort sequence (i.e., ascending or descending).

In step 103, the sort utility performs initialization. Typically, initialization includes memory allocation for various purposes. One allocated memory area may be referred to as the record save area (RSA). The RSA is intended to hold data records passed to the sort utility from the user program. Another allocated memory area may be referred to as the key save area (KSA). A given KSA generally includes: (1) a pointer to a subsequent KSA entry, (2) extracted sort keys, (3) a pointer back to the input data record. The sort utility determines an optimum size of the memory to be used to hold RSA and/or KSA.

In step 104, the sort utility requests the next record. In order to process the next record, the sort utility calls the E15 routine requesting a pointer to the next record. The E15 routine, in locating the pointer to the next record, may cause other processes to be invoked that will load additional data into the buffers allocated by the user program from the external storage. If the invocation of these other processes by the E15 routine is not well coordinated with the overall processing of the sort utility, significant elapsed time delays may result. Due to this lack of coordination of optimization or I/O processing between the sort utility and the E15 routine, there is a very high likelihood of time delays.

In step 105, the sort utility checks that a record is presented. In the case where a record is retrieved, processing continues with step 106. A null pointer indicates the end of input processing.

In step 106, the sort utility moves the data record pointed to by the E15 routine into the RSA. In moving the data to the RSA, the sort utility may need to buffer and/or move records out of the RSA and write the records to external storage media. This writing may be either synchronous or asynchronous with other operations of the sort utility, but is typically not coordinated with the E15 routine.

The sort utility extracts the sort keys used for ordering the data from the data record and places the generated key and the pointer to the original record in the KSA. The functions of the RSA and KSA may be merged into the RSA by making the RSA entry large enough to hold a pointer to the next RSA entry and the extracted sort keys, along with the input data record. Once the data is loaded in a predetermined structure (e.g., RSA and/or KSA) in memory, the actual sorting routine sorts the data. The sort utility may use any sort routine desired.

At the end of step 106, processing goes back to step 104.

For the foregoing reasons, there is a need for an improved system and method for inputing data to a sort utility from a user program such that time delays are minimized.

SUMMARY OF THE INVENTION

The present invention provides various embodiments of an improved method and system for inputting data to a sort utility from a user program (e.g., a first software program).

In one embodiment, first parameters may be provided from a first software program to the sort utility program. In one embodiment, the first parameters may facilitate optimization for both the first software program and the sort utility program, by either the first software program or by the sort utility program.

The sort utility program may process the first parameters to optimize sorting. The sort utility program processing of the first parameters may include: (i) returning second parameters to the first software program; and (ii) supporting a multi-record interface between the first software program and the sort utility program. The returned second parameters may control allocation of memory and method of processing in the first software program. Data record manipulation may be minimized by eliminating one or more moves of the elements of the data records from the first software program to the sort utility program, in various embodiments.

The first parameters and the second parameters may each include one or more of the following: an average size of a data record, a type of the data record, a count of a plurality of data records, a plurality of data buffers to allocate, a size for each data buffer in the plurality of data buffers, an indication of a capability of the first software program to extract sort keys from the plurality of data records, a location of an exit routine, a size of a master key.

The user may choose which parameters (e.g., first parameters and/or second parameters) to include at various points in the processing. For example, the type of the data record may be fixed length or variable length. In one embodiment, the exit routine for which a location is specified may be an E15 routine, as described above.

The sort utility program may process a plurality of elements of the data records into the multi-record interface for subsequent sort processing by the sort utility program. The sort utility program processing of the plurality of elements of the data records into the multi-record interface may include: constructing reformatted data records; inserting the reformatted data records into the multi-record interface.

Additionally, the sort utility program processing of the plurality of elements of the data records into the multi-record interface may include one or more calls to an exit routine (e.g., an E15 routine) to process the plurality of elements of the data records into the multi-record interface. Similar to the case where processing records into the multi-record interface is accomplished entirely within the sort utility program, the exit routine processing of the plurality of elements of the data records into the multi-record interface may include: constructing reformatted data records; inserting the reformatted data records into the multi-record interface. The number of requests for data records by the sort utility program from the exit routine may be minimized, in various embodiments.

The sort utility program may sort the elements of the data records provided by the multi-record interface. The sort utility program sorting the elements of the data records may include optimization of memory usage by the sort utility program. Similarly, the sort utility program sorting the elements of the data records may include optimization of memory usage by the first software program. In some embodiments, the sort utility program sorting the elements of the data records may include optimization of memory usage by both the sort utility program and the first software program. In some embodiments, the sort utility program sorting the elements of the data records may include the sort utility program directly processing the elements of the data records in the multi-record interface.

While elements of the data records remain to be processed, the previously described processing and sorting actions of the sort utility program may be coordinated and overlapped.

BRIEF DESCRIPTION OF THE DRAWINGS

A better understanding of the present invention can be obtained when the following detailed description of various embodiments is considered in conjunction with the following drawings, in which.

Figure 1:
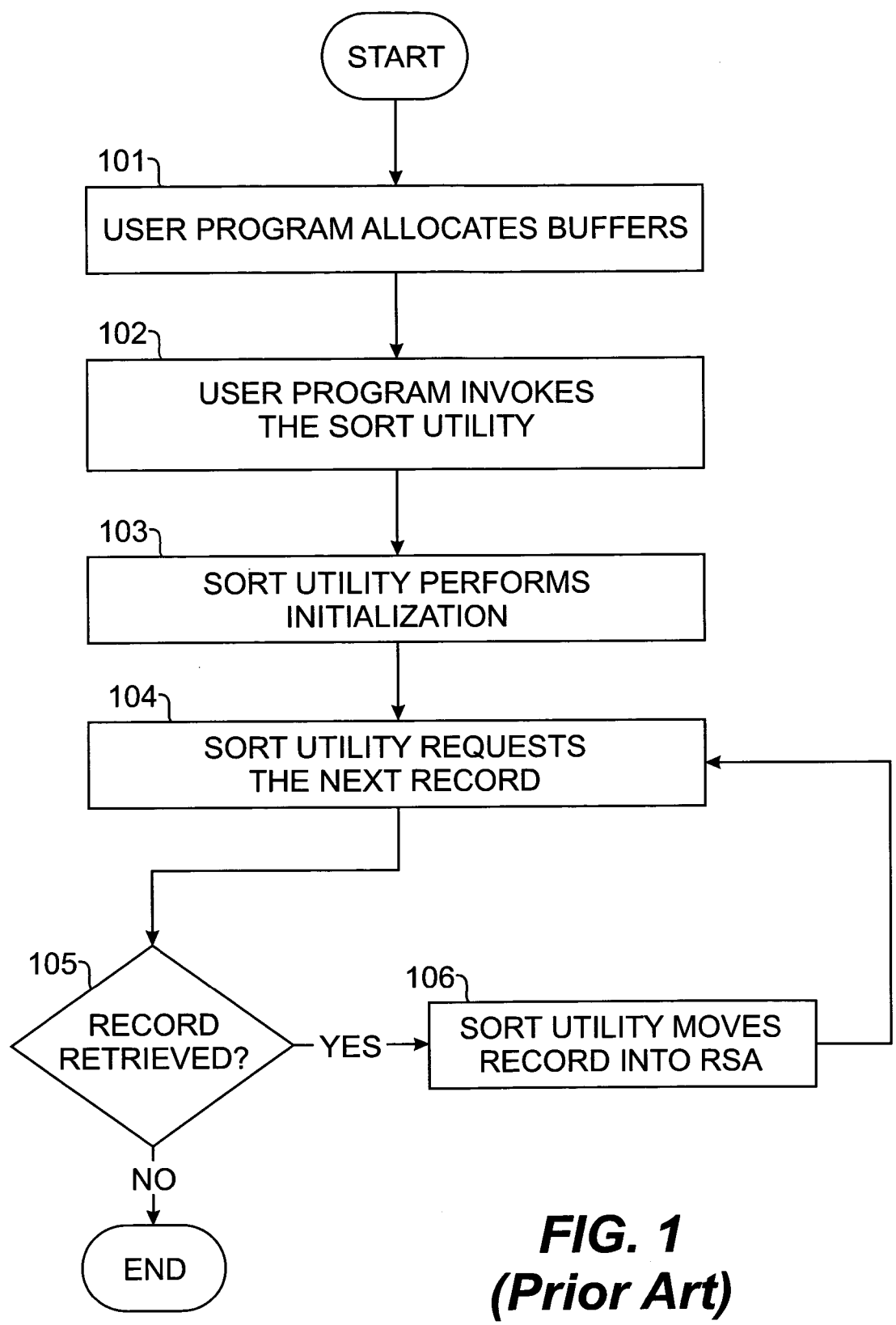
FIG. 1 is a flowchart illustrating a prior art method of a user program providing input data to a sort utility.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

Figure 2:
FIG. 2 illustrates an exemplary first computer system according to one embodiment of the present invention.

FIG. 2—First Computer System

FIG. 2 illustrates a first computer system 200 operable to execute inputing data to a sort utility from a user program. Various embodiments of systems and methods for inputing data to a sort utility from a user program are described below. The first computer system 200 may be any type of computer system, including a personal computer system, mainframe computer system, workstation, network appliance, Internet appliance, personal digital assistant (PDA), television system or other device. In general, the term "computer system" may be broadly defined to encompass any device having at least one processor that executes instructions from a memory medium.

As shown in FIG. 2, the first computer system 200 may include a display device operable to display operations associated with the inputing data to a sort utility from a user program process. The display device may also be operable to display a graphical user interface for use in the inputing data to a sort utility from a user program process. The graphical user interface may comprise any type of graphical user interface, e.g., depending on the computing platform.

The first computer system 200 may include a memory medium(s) on which one or more computer programs or software components according to one embodiment of the present invention may be stored. For example, the memory medium may store one or more software programs which are executable to perform the methods described herein. Also, the memory medium may store a programming development environment application used to create and/or execute the one or more software programs. The memory medium may also store operating system software, as well as other software for operation of the computer system.

The term "memory medium" is intended to include various types of memory or storage, including an installation medium, e.g., a CD-ROM, floppy disks, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory or storage as well, or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution.

Figure 3:
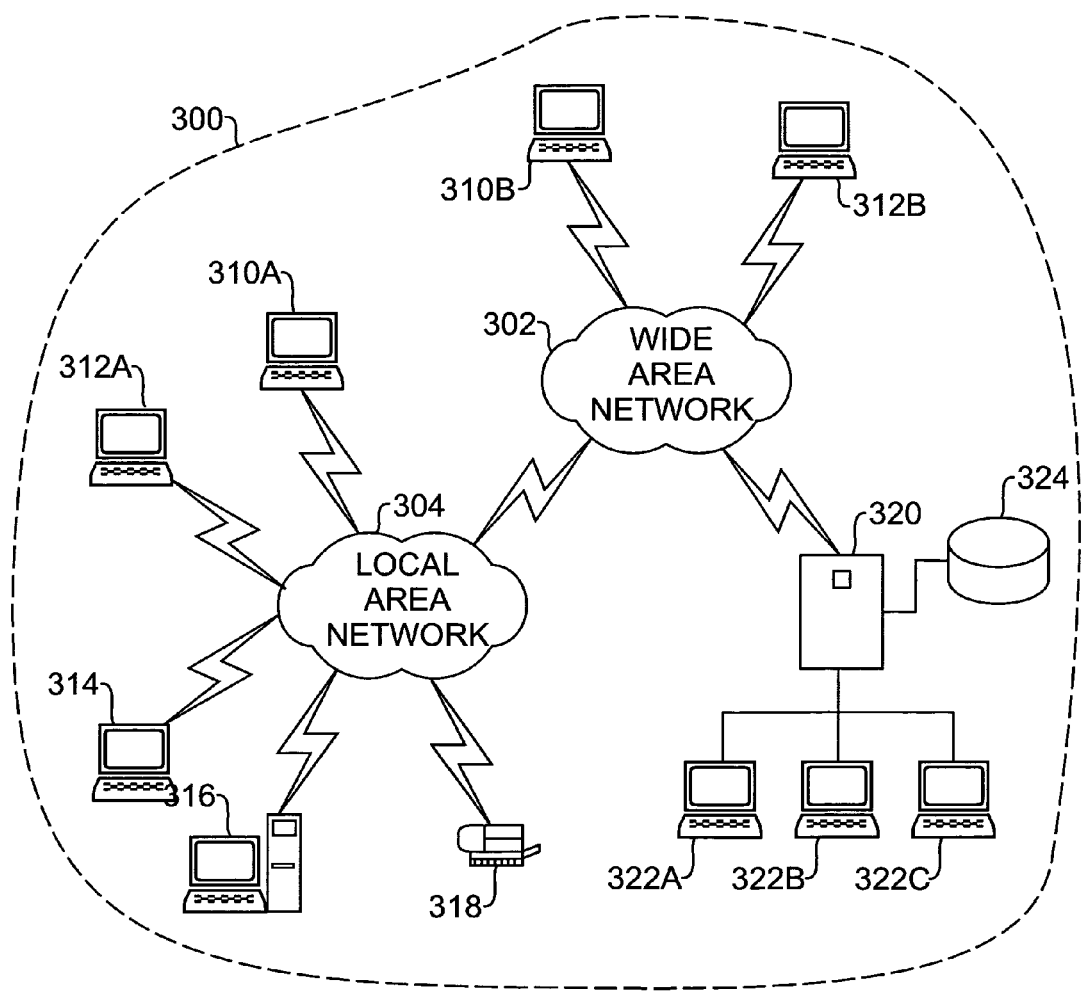
FIG. 3 illustrates an exemplary enterprise computing environment according to one embodiment of the present invention.

FIG. 3—A Typical Enterprise Computing Environment

FIG. 3 illustrates an enterprise computing environment 300 according to one embodiment of the present invention. An enterprise 300 may include a plurality of computer systems such as first computer system 200 (shown in FIG. 2) which are interconnected through one or more networks. Although one particular embodiment is shown in FIG. 3, the enterprise 300 may comprise a variety of heterogeneous computer systems and networks which are interconnected in a variety of ways and which run a variety of software applications.

One or more local area networks (LANs) 304 may be included in the enterprise 300. A LAN 304 is a network that spans a relatively small area. Typically, a LAN 304 is confined to a single building or group of buildings. Each node (i.e., individual computer system or device) on a LAN 304 preferably has its own CPU with which it executes computer programs, and often each node is also able to access data and devices anywhere on the LAN 304. The LAN 304 thus allows many users to share devices (e.g., printers) as well as data stored on file servers. The LAN 304 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves). FIG. 3 illustrates an enterprise 300 including one LAN 304. However, the enterprise 300 may include a plurality of LANs 304 which are coupled to one another through a wide area network (WAN) 302. A WAN 302 is a network that spans a relatively large geographical area.

Each LAN 304 may include a plurality of interconnected computer systems or at least one computer system and at least one other device. Computer systems and devices which may be interconnected through the LAN 304 may include, for example, one or more of a workstation 310a, a personal computer 312a, a laptop or notebook computer system 314, a server computer system 316, or a network printer 318. An example LAN 304 illustrated in FIG. 3 includes one of each of these computer systems 310a, 312a, 314, and 316 and one printer 318. Each of the computer systems 310a, 312a, 314, and 316 is preferably an example of the typical computer system 200 as illustrated in FIG. 2. The LAN 304 may be coupled to other computer systems and/or other devices and/or other LANs 304 through a WAN 302.

A mainframe computer system 320 may optionally be coupled to the enterprise 300. As shown in FIG. 3, the mainframe 320 is coupled to the enterprise 300 through the WAN 302, but alternatively the mainframe 320 may be coupled to the enterprise 300 through a LAN 304. As shown in FIG. 3, the mainframe 320 is coupled to a storage device or file server 324 and mainframe terminals 322a, 322b, and 322c. The mainframe terminals 322a, 322b, and 322c access data stored in the storage device or file server 324 coupled to or comprised in the mainframe computer system 320.

The enterprise 300 may also include one or more computer systems which are connected to the enterprise 300 through the WAN 302: as illustrated, a workstation 310b and a personal computer 312b. In other words, the enterprise 300 may optionally include one or more computer systems which are not coupled to the enterprise 300 through a LAN 304. For example, the enterprise 300 may include computer systems which are geographically remote and connected to the enterprise 300 through the Internet.

Typically, each computer system in the enterprise 300 executes or runs a plurality of software applications or processes (e.g., sort utility software programs, or user software programs). Each software application or process consumes a portion of the resources of a computer system and/or network: for example, CPU time, system memory such as RAM, nonvolatile memory such as a hard disk, network bandwidth, and input/output (I/O).

Each of the computer systems in FIG. 3 may include various standard components such as one or more processors or central processing units (CPUs) and one or more memory media, and other standard components, e.g., a display device, input devices, a power supply, etc. Each of the computer systems in FIG. 3 may also be implemented as two or more different computer systems.

At least one of the computer systems in FIG. 3 preferably includes a memory medium on which computer programs are stored. Also, the computer systems in FIG. 3 may be any type of computer system, including a personal computer system, mainframe computer system, workstation, network appliance, Internet appliance, personal digital assistant (PDA), television system or other device.

The memory medium may store one or more software programs for implementing the inputing data to a sort utility from a user program process. The software programs may be implemented in any of various ways, including procedure-based techniques, component-based techniques, and/or object-oriented techniques, among others. For example, the software programs may be implemented using C++ objects, Java objects, Microsoft Foundation Classes (MFC), or other technologies or methodologies, as desired. A CPU of one of the computer systems shown in FIG. 3 executing code and data from the memory medium comprises a means for implementing the inputing data to a sort utility from a user program process according to the methods or flowcharts described below.

Various embodiments further include receiving or storing instructions and/or data implemented in accordance with the foregoing description upon a carrier medium. Suitable carrier media include memory media or storage media such as magnetic or optical media, e.g., disk or CD-ROM, as well as signals such as electrical, electromagnetic, or digital signals, conveyed via a communication medium such as networks and/or a wireless link.

Figure 4:
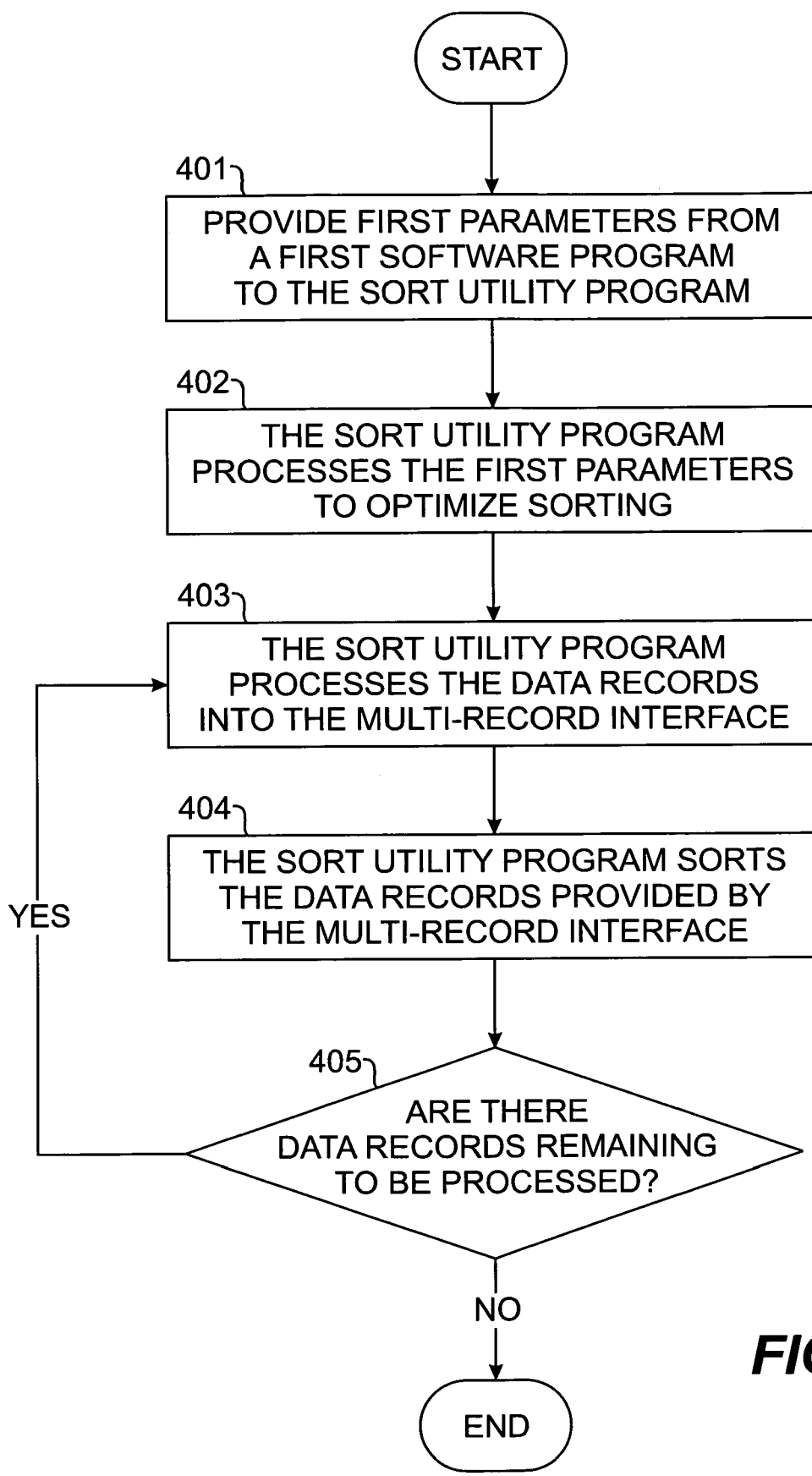
FIG. 4 is a flowchart illustrating an overview of inputing data to a sort utility from a user program according to one embodiment of the present invention.

FIG. 4—Flowchart of Inputing Data to a Sort Utility from a User Program

FIG. 4 is one embodiment of a flowchart illustrating inputing data to a sort utility from a user program (e.g., a first software program).

As shown in step 401, first parameters may be provided from a first software program to the sort utility program. The first parameters may include one or more of the following: an average size of a data record, a type of the data record, a count of a plurality of data records, a plurality of data buffers to allocate, a size for each data buffer in the plurality of data buffers, an indication of a capability of the first software program to extract sort keys from the plurality of data records, a location of an exit routine, a size of a master key. In one embodiment, the first parameters may facilitate optimization for both the first software program and the sort utility program, by either the first software program or by the sort utility program.

In step 402, the sort utility program may process the first parameters to optimize sorting. The sort utility program processing of the first parameters may include: (i) returning second parameters to the first software program; and (ii) supporting a multi-record interface between the first software program and the sort utility program. The returned second parameters may control allocation of memory and method of processing in the first software program. Data record manipulation may be minimized by eliminating one or more moves of the elements of the data records from the first software program to the sort utility program, in various embodiments.

Similar to the list of first parameters described above, the second parameters may include one or more of the following: an average size of a data record, a type of the data record, a count of a plurality of data records, a plurality of data buffers to allocate, a size for each data buffer in the plurality of data buffers, an indication of a capability of the first software program to extract sort keys from the plurality of data records, a location of an exit routine, a size of a master key.

The user may choose which parameters (e.g., first parameters and/or second parameters) to include at various points in the processing. For example, the type of the data record may be fixed length or variable length. In one embodiment, the exit routine for which a location is specified may be an E15 routine, as described above.

In step 403, the sort utility program may process a plurality of elements of the data records into the multi-record interface for subsequent sort processing by the sort utility program. The sort utility program processing of the plurality of elements of the data records into the multi-record interface may include: constructing reformatted data records; inserting the reformatted data records into the multi-record interface.

Additionally, the sort utility program processing of the plurality of elements of the data records into the multi-record interface may include one or more calls to an exit routine (e.g., an E15 routine) to process the plurality of elements of the data records into the multi-record interface. Similar to the case where processing records into the multi-record interface is accomplished entirely within the sort utility program, the exit routine processing of the plurality of elements of the data records into the multi-record interface may include: constructing reformatted data records; inserting the reformatted data records into the multi-record interface. The number of requests for data records by the sort utility program from the exit routine may be minimized, in various embodiments.

In step 404, the sort utility program may sort the elements of the data records provided by the multi-record interface. The sort utility program sorting the elements of the data records may include optimization of memory usage by the sort utility program. Similarly, the sort utility program sorting the elements of the data records may include optimization of memory usage by the first software program. In some embodiments, the sort utility program sorting the elements of the data records may include optimization of memory usage by both the sort utility program and the first software program. In some embodiments, the sort utility program sorting the elements of the data records may include the sort utility program directly processing the elements of the data records in the multi-record interface.

Step 405 is a decision step; a check is made in step 405 as to whether elements of the data records remain to be processed. In the case where elements of the data records remain to be processed, processing loops back to step 403. Otherwise, processing is completed. In one embodiment, the processing of steps 403 and 404 may be coordinated and overlapped, as opposed to being sequential.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A computer-implemented method for inputting data records to a sort utility program, the method comprising:
   providing first parameters from a first software program to the sort utility program;
   returning second parameters from the sort utility program to the first software program, wherein the second parameters control allocation of memory and method of processing in the first software program;
   allocating memory to support a multi-record interface for interfacing a plurality of elements of multiple data records between the first software program and the sort utility program;
   processing a plurality of elements of multiple data records into the allocated memory for the multi-record interface;
   sorting the elements of the multiple data records provided by the allocated memory for the multi-record interface with the sort utility program; and
   repeating the acts of processing and sorting until all elements of the data records are processed,
   wherein in the act of repeating, the acts of processing and sorting are coordinated and overlapped with one another.

2. The computer-implemented method of claim 1, wherein the data records are formatted, and wherein the act of processing the plurality of elements of the data records into the multi-record interface comprises:
   constructing reformatted data records by reformatting formatted data records; and
   inserting the reformatted data records into the multi-record interface.

3. The computer-implemented method of claim 1, further comprising minimizing data record manipulation by eliminating one or more moves of the elements of the data records from the first software program to the sort utility program.

4. The computer-implemented method of claim 1, wherein in processing the plurality of elements of the data records, the sort utility program calls an exit routine; and wherein the exit routine processes the plurality of elements of the data records into the multi-record interface.

5. The computer-implemented method of claim 4, wherein the data records are formatted, and wherein the act of processing the plurality of elements of the data records into the multi-record interface comprises:
   constructing reformatted data records by reformatting formatted data records; and
   inserting the reformatted data records into the multi-record interface.

6. The computer-implemented method of claim 4, further comprising minimizing a number of requests for data records by the sort utility program from the exit routine.

7. The computer-implemented method of claim 1, wherein the first parameters facilitate optimization for both the first software program and the sort utility program by the first software program.

8. The computer-implemented method of claim 1, wherein the first parameters facilitate optimization for both the first software program and the sort utility program by the sort utility program.

9. The computer-implemented method of claim 1, wherein the first parameters comprise one or more of: an average size of a data record, a type of the data record, a count of a plurality of data records, a plurality of data buffers to allocate, a size for each data buffer in the plurality of data buffers, an indication of a capability of the first software program to extract sort keys from the plurality of data records, a location of an exit routine, and a size of a master key.

10. The computer-implemented method of claim 1, wherein the second parameters comprise one or more of: an average size of a data record, a type of the data record, a count of a plurality of data records, a plurality of data buffers to allocate, a size for each data buffer in the plurality of data buffers, an indication of a capability of the first software program to extract sort keys from the plurality of data records, a location of an exit routine, and a size of a master key.

11. The computer-implemented method of claim 1, wherein the sort utility program sorting the elements of the data records comprises optimizing memory used by the sort utility program.

12. The computer-implemented method of claim 1, wherein the sort utility program sorting the elements of the data records comprises optimizing memory used by the first software program.

13. The computer-implemented method of claim 1, wherein the sort utility program sorting the elements of the data records comprises optimizing memory used by both the sort utility program and the first software program.

14. The computer-implemented method of claim 1, wherein the sort utility program sorting the elements of the data records in the multi-record interface comprises the sort utility program directly processing the elements of the data records in the multi-record interface.

15. A system for inputting data records to a sort utility program using a network, the system comprising:
a CPU coupled to the network; and
a system memory coupled to the CPU,
wherein the system memory stores one or more computer programs executable by the CPU; and
wherein the computer programs are executable to:
provide first parameters from a first software program to the sort utility program;
return second parameters from the sort utility program to the first software program, wherein the second parameters control the allocation of memory and method of processing in the first software program;
allocate memory to support a multi-record interface for interfacing elements of multiple data records between the first software program and the sort utility program;
process a plurality of elements of multiple data records into the allocated memory for the multi-record interface;
sort the elements of the multiple data records provided by the allocated memory for the multi-record interface with the sort utility program; and
repeat the acts of processing and sorting until all elements of the multiple data records are processed, wherein in the act of repeating, the acts of processing and sorting are coordinated and overlapped with one another.

16. The computer-implemented method of claim 15, wherein the data records are formatted, and wherein the act of processing the plurality of elements of the data records into the multi-record interface comprises:
constructing reformatted data records by reformatting formatted data records; and
inserting the reformatted data records into the multi-record interface.

17. The system of claim 15, wherein the computer programs are further executable to minimize data record manipulation by eliminating one or more moves of the elements of the data records from the first software program to the sort utility program.

18. The system of claim 15, wherein in processing the plurality of elements of the data records, the sort utility program is further executable to call an exit routine; and wherein the exit routine is further executable to process the plurality of elements of the data records into the multi-record interface.

19. The computer-implemented method of claim 18, wherein the data records are formatted, and wherein the act of processing the plurality of elements of the data records into the multi-record interface comprises:
constructing reformatted data records by reformatting formatted data records; and
inserting the reformatted data records into the multi-record interface.

20. The system of claim 18, wherein the computer programs are further executable to minimize a number of requests for data records by the soft utility program from the exit routine.

21. The system of claim 15, wherein the first parameters facilitate optimization for both the first software program and the sort utility program by the first software program.

22. The system of claim 15, wherein the first parameters facilitate optimization for both the first software program and the sort utility program by the sort utility program.

23. The system of claim 15, wherein the first parameters comprise one or more of: an average size of a data record, a type of the data record, a count of a plurality of data records, a plurality of data buffers to allocate, a size for each data buffer in the plurality of data buffers, an indication of a capability of the first software program to extract sort keys from the plurality of data records, a location of an exit routine, and a size of a master key.

24. The system of claim 15, wherein the second parameters comprise one or more of: an average size of a data record, a type of the data record, a count of a plurality of data records, a plurality of data buffers to allocate, a size for each data buffer in the plurality of data buffers, an indication of a capability of the first software program to extract sort keys from the plurality of data records, a location of an exit routine, and a size of a master key.

25. The system of claim 15, wherein in sorting the elements of the data records by the sort utility program, the sort utility program is further executable to optimize memory used by the sort utility program.

26. The system of claim 15, wherein in sorting the elements of the data records by the sort utility program, the sort utility program is further executable to optimize memory used by the first software program.

27. The system of claim 15, wherein in sorting the elements of the data records by the sort utility program, the sort utility program is further executable to optimize memory used by both the sort utility program and the first software program.

28. The system of claim 15, wherein in sorting the elements of the data records in the multi-record interface by the sort utility program, the sort utility program is further executable to directly process the elements of the data records in the multi-record interface.

29. A program storage device, readable by a programmable control device, comprising instructions stored on the program storage device for causing the programmable control device to implement:
providing first parameters from a first software program to a sort utility program;

returning second parameters from the sort utility program to the first software program, wherein the second parameters control the allocation of memory and method of processing in the first software program;

allocating memory to support a multi-record interface for interfacing elements of multiple data records between the first software program and the sort utility program;

processing a plurality of elements of the multiple data records into the allocated memory for the multi-record interface;

sorting the elements of the multiple data records provided by the allocated memory for the multi-record interface with the sort utility program; and repeating the acts of processing and sorting until all elements of the multiple data records are processed, wherein in the act of repeating, the acts of processing and sorting are coordinated and overlapped with one another.

30. The computer-implemented method of claim 29, wherein the data records are formatted, and wherein the act of processing the plurality of elements of the data records into the multi-record interface comprises:

constructing reformatted data records by reformatting formatted data records; and inserting the reformatted data records into the multi-record interface.

31. The program storage device of claim 29, wherein the program instructions are further executable to implement minimizing data record manipulation by eliminating one or more moves of the elements of the data records from the first software program to the sort utility program.

32. The program storage device of claim 29, wherein in processing the plurality of elements of the data records, the sort utility program instructions are further executable to implement calls to an exit routine; wherein the exit routine program instructions are further executable to implement processing the plurality of elements of the data records into the multi-record interface.

33. The computer-implemented method of claim 32, wherein the data records are formatted, and wherein the act of processing the plurality of elements of the data records into the multi-record interface comprises:

constructing reformatted data records by reformatting formatted data records; and inserting the reformatted data records into the multi-record interface.

34. The program storage device of claim 32, wherein the program instructions are further executable to implement minimizing a number of requests for data records by the sort utility program from the exit routine.

35. The program storage device of claim 29, wherein the first parameters facilitate optimization for both the first software program and the sort utility program by the first software program.

36. The program storage device of claim 29, wherein the first parameters facilitate optimization for both the first software program and the sort utility program by the sort utility program.

37. The program storage device of claim 29, wherein the first parameters comprise one or more of: an average size of a data record, a type of the data record, a count of a plurality of data records, a plurality of data buffers to allocate, a size for each data buffer in the plurality of data buffers, an indication of a capability of the first software program to extract sort keys from the plurality of data records, a location of an exit routine, and a size of a master key.

38. The program storage device of claim 29, wherein the second parameters comprise one or more of: an average size of a data record, a type of the data record, a count of a plurality of data records, a plurality of data buffers to allocate, a size for each data buffer in the plurality of data buffers, an indication of a capability of the first software program to extract sort keys from the plurality of data records, a location of an exit routine, and a size of a master key.

39. The program storage device of claim 29, wherein in sorting the elements of the data records by the sort utility program, the sort utility program instructions are further executable to implement optimizing memory used by the sort utility program.

40. The program storage device of claim 29, wherein in sorting the elements of the data records by the sort utility program, the sort utility program instructions are further executable to implement optimizing memory used by the first software program.

41. The program storage device of claim 29, wherein in sorting the elements of the data records by the sort utility program, the sort utility program instructions are further executable to implement optimizing memory used by both the sort utility program and the first software program.

42. The program storage device of claim 29, wherein in sorting the elements of the data records in the multi-record interface by the sort utility program, the sort utility program instructions are further executable to implement directly processing the elements of the data records in the multi-record interface.

43. The program storage device of claim 29, wherein the program storage device is a memory medium.

44. A computer-implemented sort method implementable with a sort utility, comprising:

receiving first parameters for controlling sorting, wherein the first parameters include an indication of a capability of a software program to extract sort keys from the data records;

returning second parameters for controlling memory allocation and method of processing in the software program;

allocating memory to support a multi-record interface for interfacing elements of multiple data records between the software program and the sort utility;

processing data elements of multiple data records into the allocated memory of the multi-record interface, wherein the processing includes extracting keys from the elements of the multiple data records with the first software program;

sorting the data elements of multiple data records in the allocated memory of the multi-record interface with the sort utility; and repeating the arts of processing and sorting until all data elements are sorted, wherein the repeated acts of processing and sorting are coordinated and overlapped with one another.

45. The computer-implemented method of claim 44, wherein the data records are formatted, and wherein the act of processing the plurality of elements of the data records into the multi-record interface comprises:

constructing reformatted data records by reformatting formatted data records; and inserting the reformatted data records into the multi-record interface.

46. The computer-implemented method of claim 44, wherein the act of processing data elements into the multi-record interface comprises calling an exit routine to processes the data elements into the multi-record interface.

47. The computer-implemented method of claim 44, wherein the first parameters for controlling sorting comprise one or more of: an average size of a data element, a type of the data element, a count of data elements, a plurality of data buffers to allocate, a size for a data buffer, an indication of a capability to extract sort keys from the data elements, a location of an exit routine, and a size of a master key.

48. The computer-implemented method of claim 44, wherein the second parameters for controlling memory allocation comprise one or more of: an average size of a data element, a type of the data element, a count of data elements, a plurality of data buffers to allocate, a size for a data buffer, an indication of a capability to extract sort keys from the data elements, a location of an exit routine, and a size of a master key.

49. The computer-implemented method of claim 44, wherein the act of sorting the data records in the multi-record interface comprises directly processing the data elements in the multi-record interface.

50. A program storage device, readable by a programmable control device, comprising instructions stored on the program storage device for causing the programmable control device to implement a sort method with a sort utility, the method comprising:

receiving first parameters, wherein the first parameters include an indication of a capability of the software program to extract sort keys from the data records;

returning second parameters for controlling memory allocation and method of processing in the software program;

allocating memory to support a multi-record interface for interfacing elements of multiple data records between the software program and the sort utility;

processing data elements of multiple data records into the allocated memory of the multi-record interface, wherein the processing includes extracting keys from the elements of the multiple data records with the software program;

sorting the data elements of the multiple data records in the allocated memory of the multi-record interface with the sort utility; and repeating the acts of processing and sorting until all data elements are sorted, wherein the repeated acts of processing and sorting are coordinated and overlapped with one another.

\* \* \* \* \*